(12) United States Patent
Letendre et al.

(10) Patent No.: US 12,037,048 B2
(45) Date of Patent: Jul. 16, 2024

(54) MODULAR LOW FLOOR BUS

(71) Applicant: Letenda Inc., Longueuil (CA)

(72) Inventors: Nicolas Letendre, Longueuil (CA); Jonathan Beaulieu, Longueuil (CA)

(73) Assignee: LETENDA INC., Longueuil (CA)

( * ) Notice: Subject to any disclaimer, the term of this patent is extended or adjusted under 35 U.S.C. 154(b) by 406 days.

(21) Appl. No.: 17/426,193

(22) PCT Filed: Oct. 15, 2020

(86) PCT No.: PCT/CA2020/000119
§ 371 (c)(1),
(2) Date: Jul. 28, 2021

(87) PCT Pub. No.: WO2021/072527
PCT Pub. Date: Apr. 22, 2021

(65) Prior Publication Data
US 2022/0097777 A1    Mar. 31, 2022

Related U.S. Application Data

(60) Provisional application No. 62/916,627, filed on Oct. 17, 2019.

(51) Int. Cl.
*B62D 31/02* (2006.01)
*B62D 25/20* (2006.01)
(Continued)

(52) U.S. Cl.
CPC ........... *B62D 31/025* (2013.01); *B62D 25/20* (2013.01); *B62D 29/001* (2013.01);
(Continued)

(58) Field of Classification Search
CPC .... B62D 31/025; B62D 63/025; B62D 24/00; B62D 65/04; B62D 27/06; B62D 25/20; B62D 29/001; B60Y 2200/1432
(Continued)

(56) References Cited

U.S. PATENT DOCUMENTS

| | | |
|---|---|---|
| 2,425,948 A | 8/1947 | Rene |
| 2,700,570 A | 1/1955 | Barenyi |

(Continued)

FOREIGN PATENT DOCUMENTS

| | | |
|---|---|---|
| CA | 3033260 A1 | 2/2019 |
| CN | 101665123 A | 3/2010 |

(Continued)

OTHER PUBLICATIONS

Xu et al., CN 105818871 A, machine translation, Aug. 3, 2016 (Year: 2016).*

*Primary Examiner* — Amy R Weisberg
*Assistant Examiner* — Wenwei Zhuo
(74) *Attorney, Agent, or Firm* — NORTON ROSE FULBRIGHT CANADA LLP

(57) ABSTRACT

A low floor road vehicle, in the form for example of a passenger bus, includes a front module that includes the front load-carrying axle at its front, a rear module including the rear load-carrying axle, a central module having a flat floor and lateral side walls that longitudinally extend beyond both longitudinal ends of the flat floor so as to define front and back module attaching portions, and a roof mounted to both lateral side walls so as to extend beyond the floor both towards the front and back, which brings rigidity to the overall structure. The vehicle being modular, the central module can be configured to a specific application, for example by varying the length thereof, while same configurations of the front and rear modules can be used in all applications. Also, the front axle being located at the front of the front module, the access to the passenger area defined by the flat floor is improved.

22 Claims, 9 Drawing Sheets

(51) Int. Cl.
  *B62D 29/00* (2006.01)
  *B60K 1/00* (2006.01)
  *B60K 1/04* (2019.01)

(52) U.S. Cl.
  CPC .......... *B60K 2001/001* (2013.01); *B60K 1/04* (2013.01); *B60K 2001/0416* (2013.01)

(58) Field of Classification Search
  USPC ... 296/193.04, 193.03, FOR. 117, FOR. 118, 296/178
  See application file for complete search history.

(56) References Cited

U.S. PATENT DOCUMENTS

| | | | |
|---|---|---|---|
| 4,422,685 A | 12/1983 | Bonfilio et al. | |
| 4,881,756 A | 11/1989 | Kumasaka et al. | |
| 5,401,056 A | 3/1995 | Eastman | |
| 5,619,784 A * | 4/1997 | Nishimoto | B62D 65/04 29/430 |
| 6,375,249 B1 | 4/2002 | Stanton et al. | |
| 6,896,319 B1 * | 5/2005 | Huang | B62D 25/02 296/193.06 |
| 7,862,101 B2 | 1/2011 | Lusk et al. | |
| 8,453,773 B2 | 6/2013 | Hill et al. | |
| 8,720,617 B2 | 5/2014 | Peng et al. | |
| 9,252,417 B2 | 2/2016 | Hill et al. | |
| 2002/0033299 A1 * | 3/2002 | Thomas | B60G 3/18 280/788 |
| 2007/0102958 A1 * | 5/2007 | Fillion | B62D 33/044 296/178 |
| 2011/0017527 A1 | 1/2011 | Oriet et al. | |
| 2016/0207418 A1 * | 7/2016 | Bergstrom | B60G 3/06 |
| 2018/0345971 A1 * | 12/2018 | Birnschein | B60K 17/356 |
| 2020/0114995 A1 | 4/2020 | Anderson et al. | |
| 2020/0180706 A1 * | 6/2020 | Cha | B62D 25/08 |
| 2021/0046985 A1 * | 2/2021 | Claesson | B60P 3/42 |
| 2021/0331749 A1 * | 10/2021 | Hwang | B62D 65/04 |

FOREIGN PATENT DOCUMENTS

| | | | | |
|---|---|---|---|---|
| CN | 103129359 A | | 6/2013 | |
| CN | 203199034 U | | 9/2013 | |
| CN | 105818871 A | * | 8/2016 | |
| DE | 4330559 A1 | * | 3/1995 | ........... B62D 25/082 |
| WO | WO-2005095192 A1 | * | 10/2005 | ........... B62D 27/06 |
| WO | WO-2008151087 A2 | * | 12/2008 | ........... B62D 25/082 |
| WO | WO-2013093531 A1 | * | 6/2013 | ........... B62D 29/046 |
| WO | 2018115664 A1 | | 6/2018 | |
| WO | PCT/CA2020/000119 | | 10/2020 | |

* cited by examiner

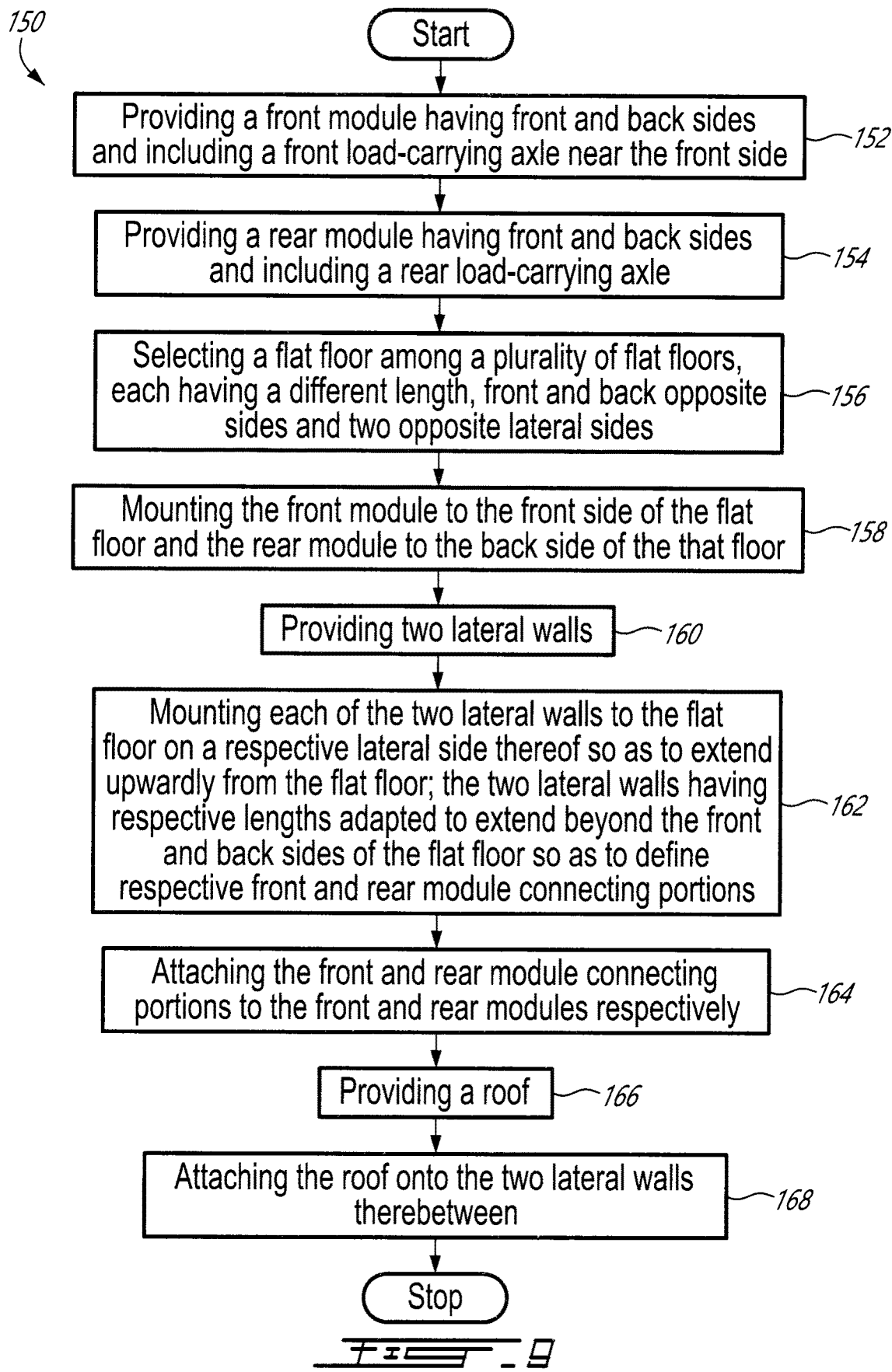

MODULAR LOW FLOOR BUS

FOREIGN PRIORITY CLAIM

This is a 35 U.S.C. § 371 application of, and claims priority to, International Application No. PCT/CA2020/000119, which was filed on Oct. 15, 2020, and published as Publication No. WO 2021/072527, which claims priority to U.S. Provisional Patent Application No. U.S. 62/916,627, which was filed on Oct. 17, 2019, the entirety of all the applications are incorporated herein by reference.

FIELD

The present invention generally relates to busses and more specifically to a low floor bus.

BACKGROUND

On conventional low floor buses, the passenger area or cargo compartment is limited by two front wheel cases and a two-step stair structure towards the rear end of the passenger compartment.

Due to passenger traffics, the conventional structure cause inconveniences to passengers as well as reducing operating time of vehicles. This structure also limits the number of wheelchairs area.

The conventional low floor bus structure is also designed for a specific vehicle length. Presently, when a bus manufacturer wants to offer a bus with a different length, they must create an entirely new structure. This process is time and money consuming and cause inconvenience to the bus manufacturer.

United States Patent Publication No. US 2020/0114995 published on Apr. 16, 2020, naming Anderson et al. and titled "Motor Vehicle Modular Construction" describes a motor vehicle modular construction that tries to solve the above drawbacks wherein the modularity is based on a plurality of chassis and body parts, including a base chassis formed by a plurality of sub-assemblies, a vehicle body with a unitized frame, and a powertrain module.

A drawback of the vehicle proposed by Anderson is that its modularity is very complex and not based on the length of the vehicle. This complexifies varying the length thereof along with its construction.

Also, the chosen modularity results in the front axle being located behind the driver area, which limits the access of the passenger area.

SUMMARY

The problem of the combined lack of modularity of current low floor buses and lack of accessibility to the passenger area is solved by providing a low floor bus structure having a front module that includes the front load-carrying axle at its front, a rear module including the rear load-carrying axle, and a central module having a flat floor and lateral side walls that longitudinally extend beyond the flat floor so as to define front and back module attaching portions.

According to an illustrative embodiment, there is provided a low floor road vehicle comprising:
a front module having front and back sides and including a front load-carrying axle near the front side thereof;
a rear module having front and back sides and including a rear load-carrying axle; and
a central module including i) a flat floor having a front, a back and two lateral sides, ii) first and second lateral walls, each one mounted to the flat floor so as to extend perpendicularly from a respective lateral side thereof, iii) a roof mounted onto the first and second lateral walls therebetween; the flat floor being attached at its front side to the front module at the back side thereof and at its back side to the rear module at the front thereof; the first and second lateral walls extending a) longitudinally beyond the front side of the flat floor so as to define a front module attaching portion that connects to the front module, and b) longitudinally beyond the back side of the flat floor so as to define a rear module attaching portion that receives the rear module therebetween.

According to another embodiment, there is provided a method of assembling a low-floor road vehicle comprising:
providing a front module having front and back sides and including a first steel frame and a front load-carrying axle near the front side;
providing a rear module having front and back sides and including a second steel frame and rear load-carrying axle;
providing a flat floor having front and back opposite sides and two opposite lateral sides; the flat floor being selected from a plurality of flat floors, each being defined by a length;
mounting the front module to the front side of the flat floor and the rear module to the back side of the flat floor;
providing two lateral walls;
mounting each of the two lateral walls to the flat floor on a respective lateral side thereof so as to extend upwardly from the flat floor; the two lateral walls having respective lengths adapted to extend beyond the front and back sides of the flat floor so as to define respective front and rear module connecting portions;
attaching the front and rear module connecting portions to the front and rear modules respectively.
providing a roof; and
attaching the roof onto the two lateral walls therebetween.

According to a further illustrative embodiment, there is provided a low floor bus comprising:
a front module having front and back sides and including a nose section on the front side, a front load-carrying axle in the nose section, and a driver's section extending from the nose section to the back side of the front module; the driver's section including an upper platform on a first lateral side thereof, a driver's seat on the upper platform, a lower platform longitudinally adjacent the upper platform on a second lateral side thereof;
a rear module having front and back sides and including a rear load-carrying axle; and
a central module including i) a flat floor having a front, a back and two lateral sides and being levelled with the lower platform of the front module, ii) first and second lateral walls, each including an aluminum frame and being mounted to the flat floor so as to extend perpendicularly from a respective lateral side thereof, iii) a roof mounted onto the first and second lateral walls therebetween; the flat floor being attached at its front side to the front module at the back side thereof and at its back side to the rear module at the front thereof; the first and second lateral walls extending a) longitudinally beyond the front side of the flat floor so as to define a front module attaching portion that connects to the front module, and b) longitudinally beyond the back side of the flat floor so as to define a rear module attaching portion that receives the rear module therebetween; the front module attaching portion of one of the first and second lateral walls including a door registered with the driver's seat.

The low floor vehicle being modular, the central module can be configured to a specific application, for example by varying the length thereof, while same configurations of the front and rear modules can be used in all applications. This allows streamlining the manufacturing process of the bus.

It is to be noted that the expression flat floor is to be construed in the description and in the claims as including a floor structure that generally smooth and levelled at least throughout its full upper area.

Also, the front axle being located at the front of the front module, the access to the passenger area defined by the flat floor is improved.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale

BRIEF DESCRIPTION OF THE DRAWINGS

In the Appended Drawings:

FIG. 9 is a flowchart summarizing a first illustrative embodiment of a method of assembly of a low floor bus.

DETAILED DESCRIPTION

Figure 1:
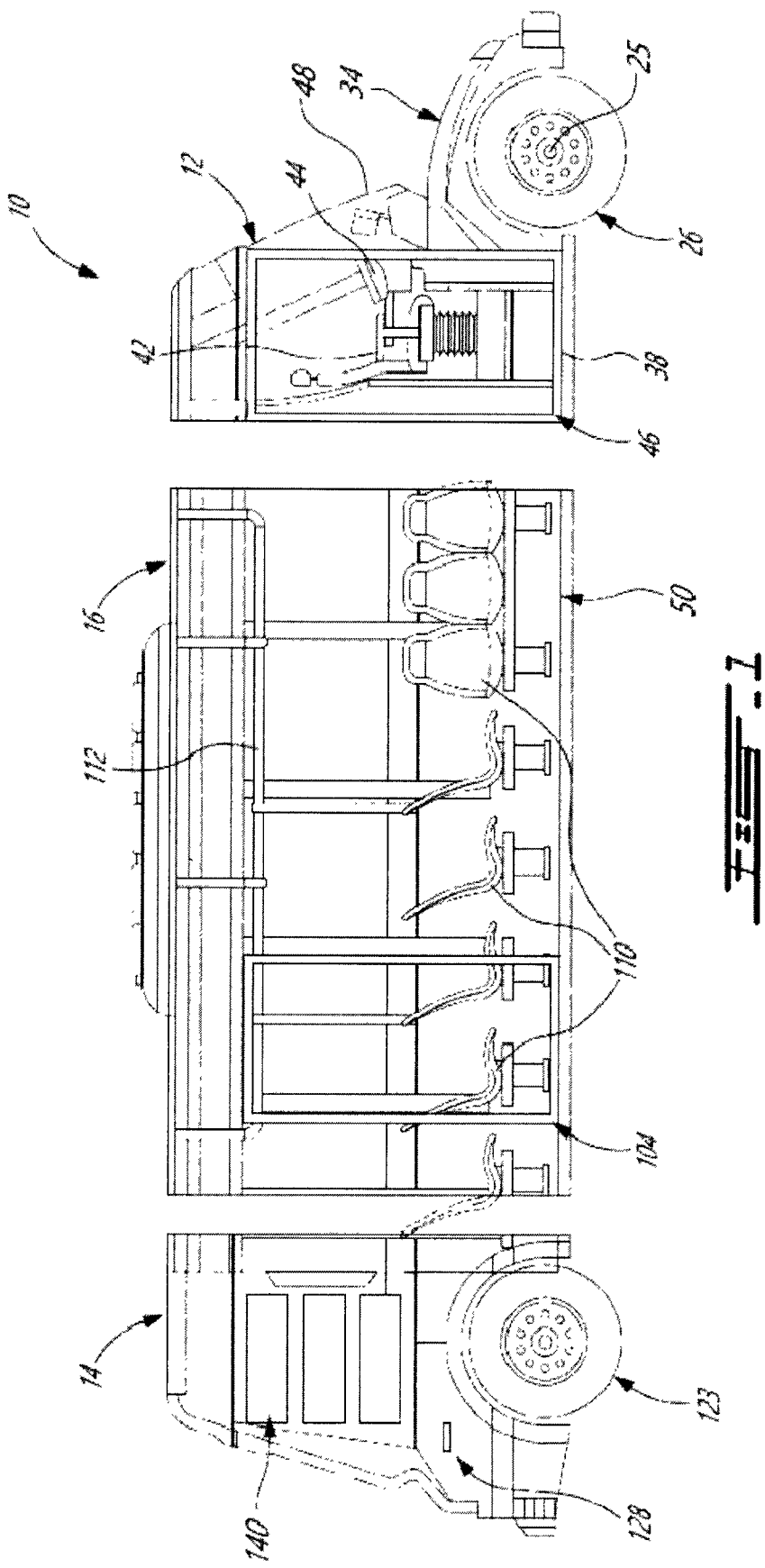
FIG. 1 is a left-side elevation exploded schematic view of a low floor bus according to a first illustrative embodiment, illustrating the modularity thereof.
Figure 2:
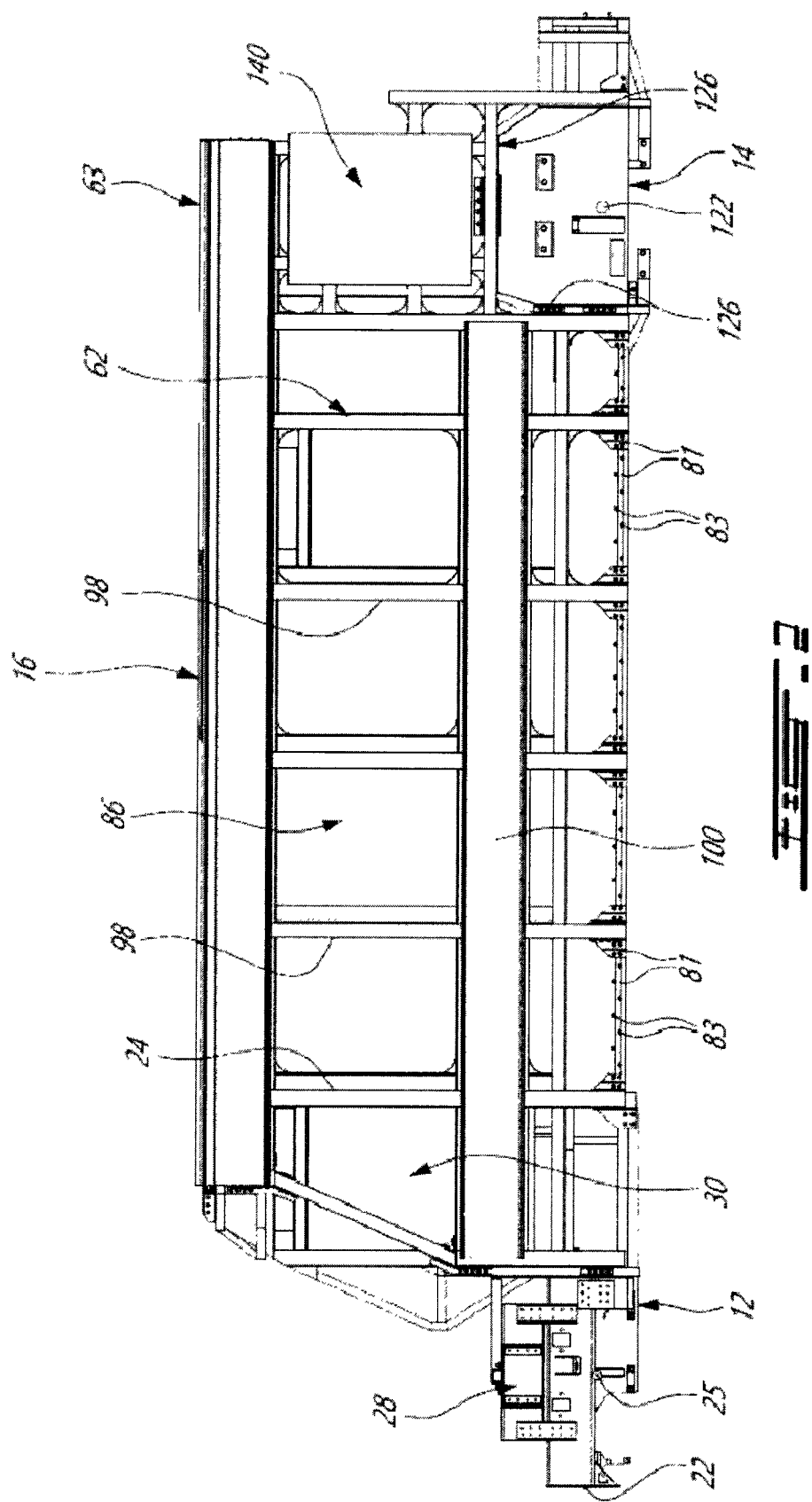
FIG. 2 is right-side elevation of the main structure of the bus from FIG. 1.

In the following description, similar features in the drawings have been given similar reference numerals, and in order not to weigh down the figures, some elements are not referred to in some figures if they were already identified in a precedent figure. Herein, it shall further be noted that, for avoiding unnecessary details obscuring the invention, only device structures and/or processing steps closely relevant to schemes according to the invention are shown in the accompanying drawings while omitting other details less relevant to the invention.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, un-recited elements.

A first illustrated embodiment of a low floor road vehicle 10 will now be described with reference to FIGS. 1 to 4. The low floor road vehicle being the form of a passenger bus.

The low-floor bus 10 comprises a front module 12, a rear module 14, a central module 16 therebetween.

As will become more apparent upon reading the following description, the configuration of the low floor bus 10 allows adapting the central module 16, and more specifically its length, for specific needs, and thus without requiring any modification to the front and rear modules 12 and 14.

Figure 8:
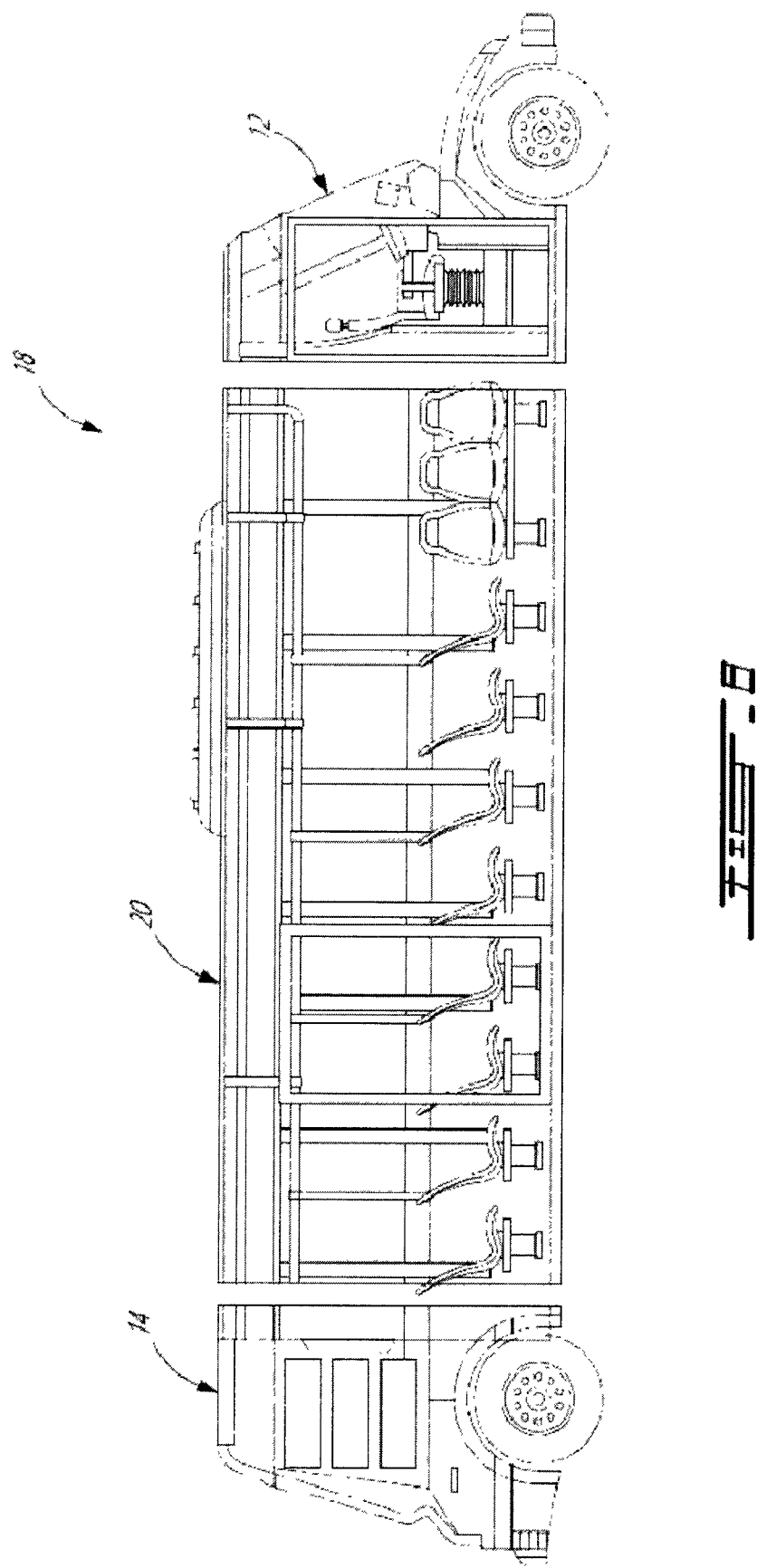
FIG. 8 is a side elevation exploded schematic view of a low floor bus according to a second illustrative embodiment, illustrating the modularity thereof.

For example, FIG. 1 shows a thirty (30) feet length bus 10 (about 9.14 m), while FIG. 8 shows a forty (40) feet length bus 18 (about 12.19 m), which differ only by the length of their central modules 16 and 20.

It is to be noted that FIGS. 1 and 8 are provided only to illustrate the modularity of illustrative embodiments 10 and 18 of low floor buses, and the capacity thereof to adapt their central modules 16 and 20 and more specifically their length for specific needs. The connectivity features of the central modules 16 to the front and rear modules 12 and 14 are omitted to alleviate the views and to highlight the above-noted features.

Among other advantages, the modular configuration of a low floor bus according to illustrative embodiments allows streamlining the manufacturing thereof.

The front module 12 has front and back sides 22 and 24 and includes a front load-carrying axle 25 near the front side thereof 22, and two front road wheels 26 (only one shown) rotatably mounted to the front load-carrying axle.

More specifically, the front module 12 has i) a nose section 28 extending between the front side 22 and a generally rectangular and planar frame structure 29, which is located near the longitudinal central of the front module 12, and ii) a driver's section 30 extending between the frame structure 29 and the back side 24.

The nose section 28 defines the front part of the front module 12 and includes a first frame assembly 32 secured to the frame structure 29, the front load-carrying axle 25 (not shown in FIG. 3) operatively mounted thereto, the two wheels 26, each rotatably mounted to a respective end of the axle 25, transmission elements (not shown), a front steering system (not shown) secured to the first frame assembly 32 and operatively coupled to the two rear road wheels 26, the front body 34 and other conventional vehicle parts (not shown). Such other conventional parts are not shown so as to alleviate the view and will not be described herein in more detail for concision purposes and considering that they are believed to be beyond the scope of the present disclosure.

The driver's section 30 includes a second frame assembly 36 integrally mounted to the first frame assembly 32 via the frame structure 29. The second frame assembly 36 is configured to define a lower platform 38, which defines a front passenger's entrance, and a higher platform 40, which is laterally registered with the lower platform 38, and which defines a driver's area.

The driver's section 30 is generally configured to define a cockpit for a driver (not shown) and as such includes a driver seat 42 mounted to the higher platform 40, command and control systems including, without limitations a steering wheel 44, accelerator and brake pedals (not shown), etc. which are coupled to an onboard controller (not shown) that is, in turn, coupled to rear and front steering systems, respectively coupled to the rear and front axle and to a drive system located in the rear module (all not shown).

The driver's section 30 further includes a door frame 46, which sits on the lower platform 38 and is therefore aligned with the higher platform 40, and thus the driver's seat 42. This is allowed by the front axle 25 being in front of the driver's seat 42. As will be described hereinbelow in more detail, the lower end of the door frame 46 is also levelled with the floor 50 of the passenger compartment defined by the central module 16.

According to another embodiment (not shown), the front door 46 is not aligned with the driver's seat 42 or is omitted.

The frame structure 29 and first and second frame assemblies 32 and 36 are made of steel but are not limited to such material.

The driver's section 30 further includes a bay window 48, which is secured to the first and second frame assemblies 32 and 36, and other conventional parts which are not shown so as to alleviate the view and which will not be described herein in more detail for concision purposes and considering that they are believed to be beyond the scope of the present disclosure.

With reference to FIGS. 2-5, the central module 16 will now be described in more detail.

The central module 16 includes i) a flat floor 50 having a front 52, a back 54 and two lateral sides 56 and 58, ii) first and second lateral walls 60-62, each one mounted to the flat floor 50 so as to extend perpendicularly from a respective lateral side 56-58 thereof, and iii) a roof 63 mounted onto the first and second lateral walls 60-62 therebetween.

The flat floor 50 has a multilayer aluminum and foam structure which is both rigid and lightweight. The flat floor 50 structure further includes inserts (not shown), which are provided to limit the galvanic corrosion. According to another embodiment, the flat floor 50 is made of other materials and/or has another structure.

The surface of the floor 50 and the volume above it define the passenger area. It has been found that providing a one-level low floor in the central passenger module 16 improves the passenger access to the bus 10 and paratransit.

A rectangular frame 64 surrounds the multilayer structure, which allows securing thereto the lateral walls 60-62 and the front and rear modules 12 and 14. More specifically, the frame 64 includes a front bracket 66 which connects to a back transversal bracket 68 on the driver's section 30, which corresponds to the back side 24 of the front module 12. Two spacers 70-72 are mounted between the brackets 66 and 68, which are all attached using fasteners (not shown).

The rectangular frame 64 further includes a rear bracket 74 for connecting to a corresponding front transversal bracket 76 on the rear module 14.

The rectangular frame 64 is also defined by two lateral frame elements 75, which extends from the front bracket 66 to a small distance beyond the rear bracket 74, so as to define therewith a rear module-receiving interspace 78. Spacers 80-82 are provided between the brackets 74 and 76, which are all attached using fasteners (not shown).

The spacers 70-72 and 80-82 are provided for a precise contact between the floor 50 and the front and rear modules 12 and 14.

The assembly of the flat floor 50 to the front module 12 results in the flat floor 50 being leveled with the lower platform 38 of the front module 12. This facilitates the access to the bus 10 to passengers, especially for those with limited mobility.

According to another embodiment (not shown), the attachment between the floor 50 and the front and rear modules 12-14 is achieved using other brackets than those illustrated or using other connecting elements.

The first and second lateral walls 60-62 are made of extruded aluminum and are secured to the flat floor 50 via a respective one of the two lateral frame elements 75 using brackets 81 and fasteners 83.

Each of the first and second lateral walls 60-62 includes a respective central section 84 and 86 and respective front and back sections 88-90 and 92-94. The central sections 84 and 86 extend along the length of the flat floor 50, and the front 88, 92 and back 90, 94 sections extend longitudinally beyond the floor 50 from the central sections 84 and 86 so as to define respectively a front module attaching portion and a rear module attaching portion.

Each of the first and second lateral walls 60-62 includes a longitudinal beam 96 which define the upper edge thereof. Also, as will be described hereinbelow in more detail, the longitudinal beams 96 receive the roof 63 thereon.

The central sections 84 and 86 includes frame elements 98 and panels 100 which define mounting elements for various components (not shown) of the bus 10 as well as window openings 102, a passenger door frame 104 having a lower side levelled with the floor 50, etc.

The front section 88 on a first side of the bus 10 includes a door frame 106 which is integral to the central section 84 and which is attached via brackets 107 and fasteners to the frame structure 29 and to other parts of the front module 12. The door frame 106 is registered with the lower platform 38 so as to define a front passenger entrance therewith.

The front section 92 on the second side includes a window frames 108 which is integral to the central section 86 and which is attached via brackets 109 and fasteners to the frame structure 29 and to other parts of the front module 12.

Both back sections 90 and 94 are identical and are defined by various frame elements that are integral to the central sections 84 and 86 respectively and which defines the rear module mounting portion of the central portion 16.

Similar to the floor 50, the roof 63 has a multilayer aluminum and foam panel structure which is both rigid and lightweight. According to another embodiment, the roof 63 is made of other materials and/or has another structure.

As described hereinabove, the roof 63 is mounted onto the first and second lateral walls 60-62 therebetween and is attached thereto using fasteners (not shown).

Of course, the central module 16 is generally configured to receive passengers (not shown) and includes a plurality of rows of seats 110, handlebars 112, etc. and further includes various other interior and exterior elements and parts which are not shown so as to alleviate the view and which will not be described herein in more detail for concision purposes.

Since interior bus features and facilities for passengers and drivers are believed to be well-known in the art, they will not be described herein in more details for concision purposes.

Using aluminum for the lateral walls 60-62 and for the rigid parts of the floor 50 and roof 63, or any such lightweight material, allows to lighten the overall vehicle, yielding lower operational costs compared to conventional buses.

According to another embodiment (not shown), the lateral walls of the central module 16 are different than illustrated.

The rear module 14 includes a steel frame 114 that is configured and sized to define two (2) wheel arches 116, a connecting portion 118, that includes the transversal bracket 76, to attach the rear module 14 to the central module 16, and other frame elements to receive and support various parts of the bus.

The frame 114 of the rear module 14 is configured and sized to fit within the rear module attaching portion defined by the portions of both lateral walls 60-62 that extend longitudinally beyond the flat floor 50 so as to be integrated thereto.

Both the steel frame 114 of the rear module 14 and both lateral walls 60-62 of the central module 16 are provided with corresponding brackets 120 and 121 (only shown on one side) that are located at a plurality of locations corresponding to the wheels arches 116 to further secure the rear module 14 to the central module 16 using fasteners.

The rear module also includes a rear load-carrying axle 122 and two rear road wheels 123 (only one shown) rotatably mounted to the rear load-carrying axle 122. Both back sections 90 and 94 of the lateral walls 60 and 62 includes a wheel-receiving portion 124-126 that is registered with the wheel arches 116 to accommodate the wheels 123.

The rear module 16 also includes a rear steering system (not shown) secured to the steel frame assembly 114 and operatively coupled to the two rear road wheels 123, a drive motor (not shown) secured to the frame assembly 114 and operatively coupled to the two rear road wheels 123.

In addition to allowing a low floor along the full length of the central module 16, providing independent steering systems at the front and rear modules 12 and 14 allows minimizing the turning radius and thus facilitating the access to bus stops (not shown).

The rear module 16 further includes body parts 128, windows (not shown) and other conventional parts which are not shown so as to alleviate the view and which will not be described herein in more detail for concision purposes and considering that they are believed to be beyond the scope of the present disclosure.

According to the first illustrative embodiment, the structural parts of the rear module 16 are made of steel. According to another embodiment, the structural parts of the rear module 16 are made of another material than steel and/or have another configuration than illustrated.

Figure 4:
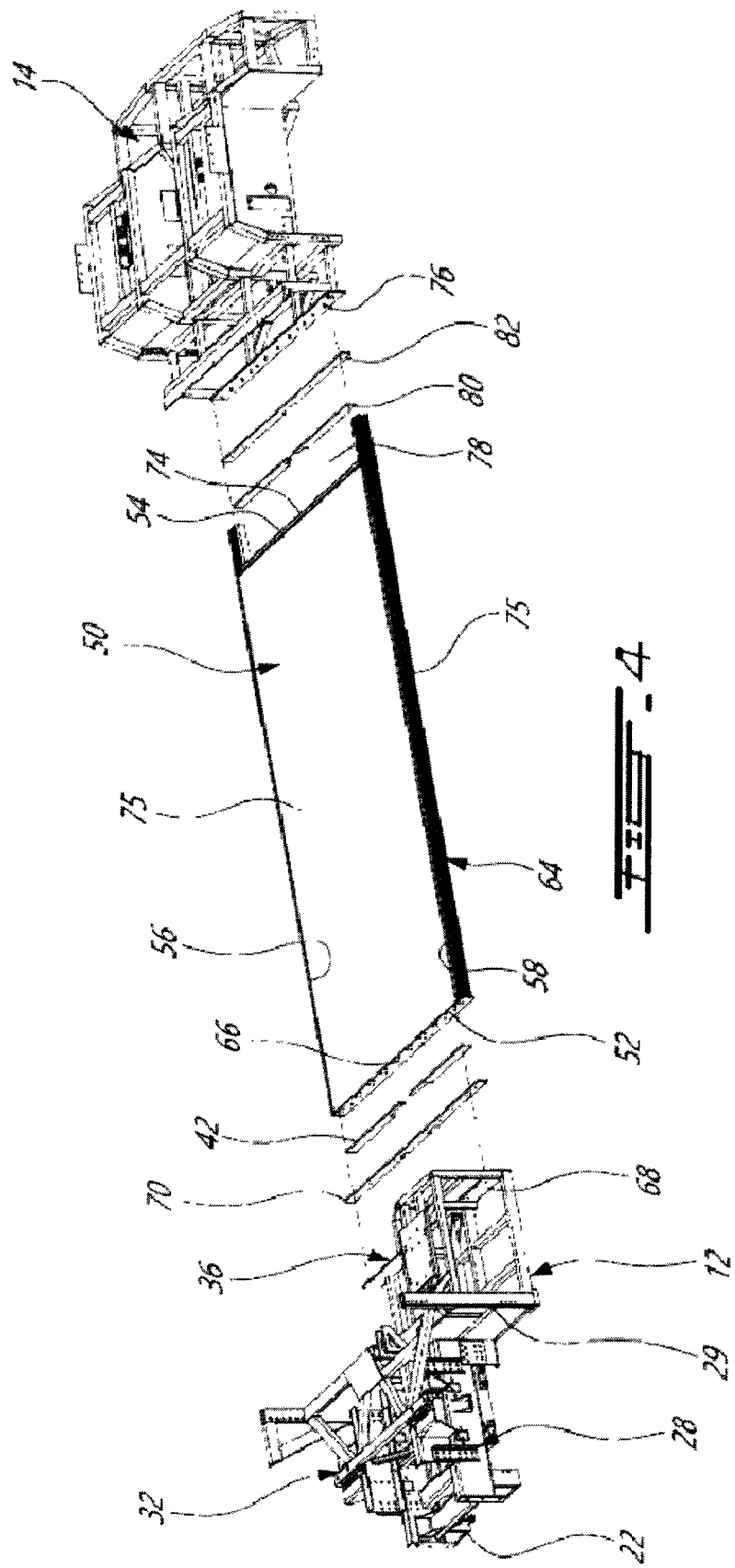
FIG. 4 is front right-side perspective, illustrating the assembly of the front and rear modules to the flat floor of the central module.
Figure 5:
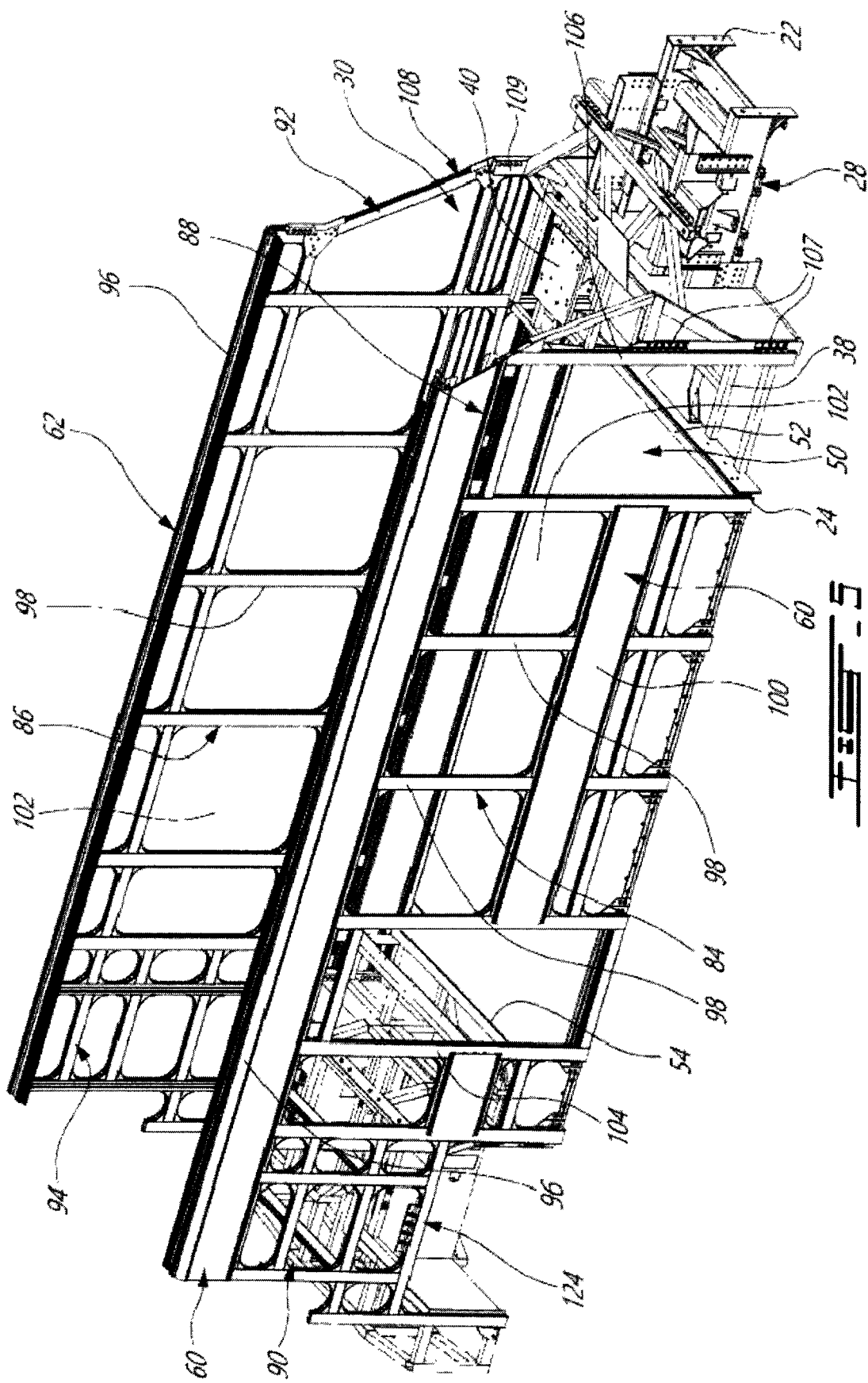
FIG. 5 is a front left-side perspective of the main structure of FIG. 2, shown prior to assembly of the roof panel.
Figure 6:
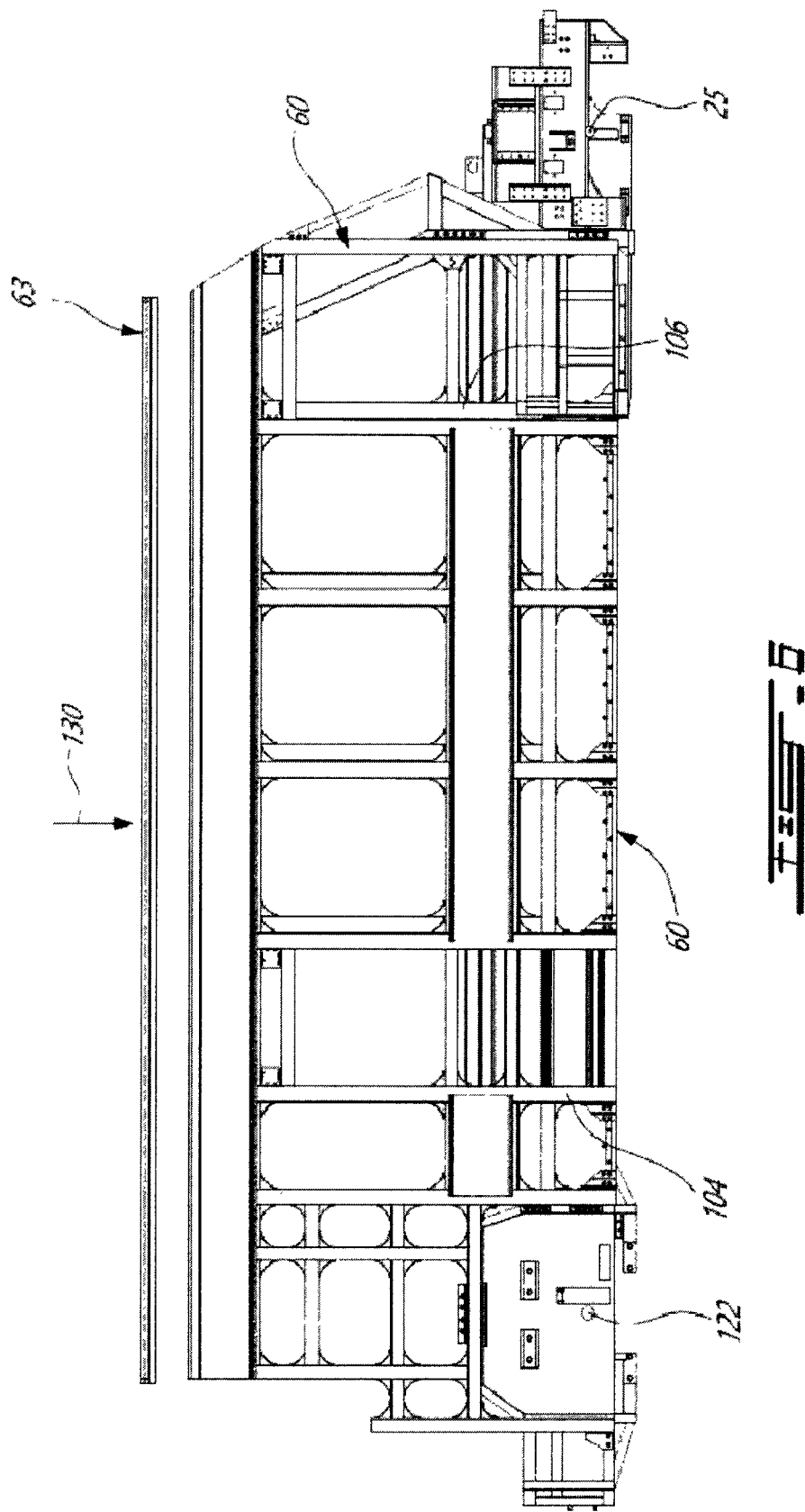
FIG. 6 is a left-side perspective of the main structure of FIG. 2, illustrating the assembly of the roof panel to both lateral walls thereof.

The sequence of steps shown in FIGS. 4 to 6 summarize the assembly of the low floor bus 10, and more specifically of the main structure thereof. FIG. 9 also summarizes the assembly method 150 of the low-floor bus 10.

As can be seen in FIG. 4 and described hereinabove, the front and rear module 12 and 14 are joined with the flat floor 50.

With reference to FIG. 5 and the description hereinabove, the two lateral walls 60 and 62 are then attached to the flat floor 50 and to both front and rear modules 12 and 14 via the front and back sections 88-94 of the two lateral walls 60 and 62.

Then, as illustrated in FIG. 6, the roof 63 is mounted and attached to both lateral walls 60-62 (see arrow 130). Such mounting of the roof 63 as illustrated brings rigidity between the two lateral walls 60-62 and to the overall structure of the bus 10.

Figure 3:
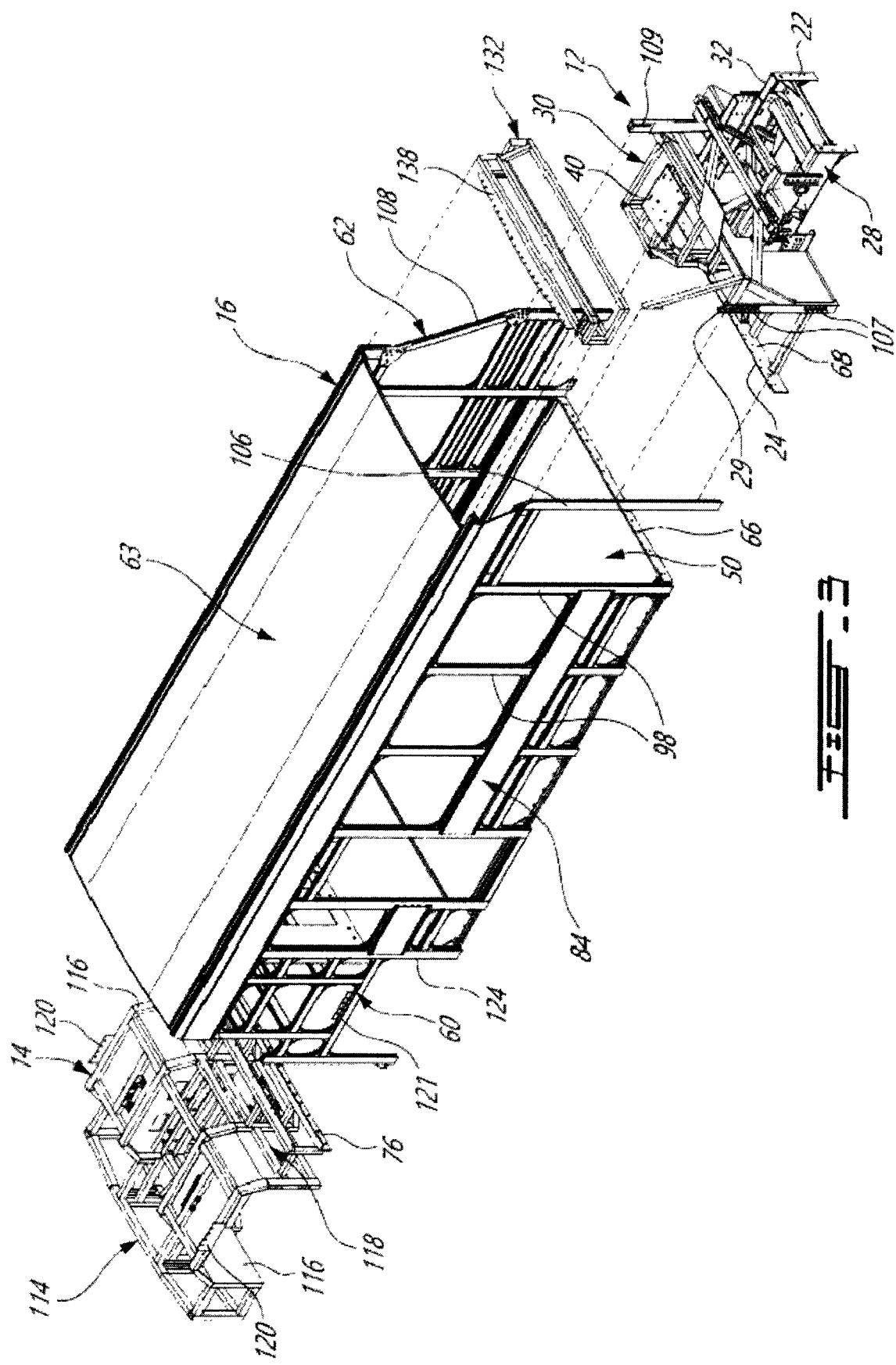
FIG. 3 is an exploded front left-side perspective of the main structure of the bus from FIG. 1, illustrating the front, back and central modules of the bus before unassembled.
Figure 7:
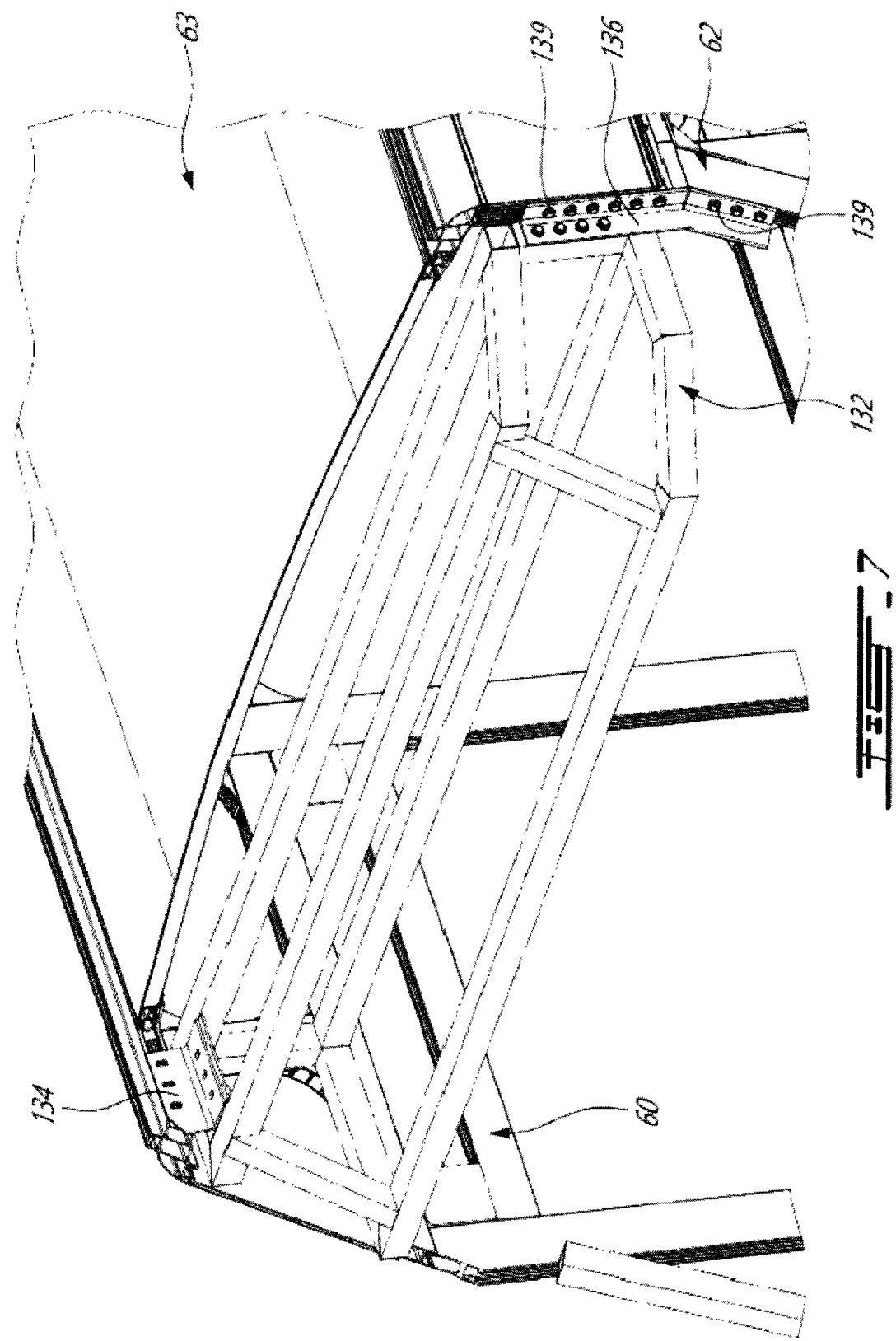
FIG. 7 is a right-side close up perspective view of the main structure from FIG. 2, showing the assembly of the destination sign to both side walls thereof.

Finally, with reference to both FIGS. 3 and 7, the destination sign frame 132 is mounted to both lateral walls 60-62 in front of the roof 63 using brackets 134-138 (only two (2) shown) and fasteners 139.

According to the illustrative embodiment, the bus 10 is electrically powered and further includes a battery or fuel cell module 140, which is removably mounted onto the rear module 14 so as to be easily removed from the rear and swapped for another module (not shown), for example for its charging. Such a module 140 is coupled to the drive motor.

According to another illustrative embodiment, the energy or full cell module is fixedly mounted onto the rear module 14.

Since electric vehicle operation and parts are believed to be well known in the art, they will not be described herein in more detail for concision purposes.

It is to be noted that the onboard controller, the command and control systems, and front and rear steering systems are interconnected wirelessly and/or through cables and wires.

According to another embodiment (not shown), the drive motor is a gas engine and the rear module 14 houses a fuel tank.

A person skilled in the art will now appreciate that the central module 16 is monocoque.

Moreover, the roof 63 extends beyond the floor 50 both towards the front and back, which brings rigidity to the overall structure.

Providing a low floor structure along the full length of the central module 16 and the modularity of the bus 10 are both facilitated by the absence in the central module 16 of wheels, motors, transmission or of any mechanical power transmission mechanism.

It is to be noted that many conventional components of a bus, which are of less interests to the present disclosure, are not shown in the drawings to alleviate the views or are shown and will not be described herein for concision purposes.

It is to be noted that many modifications could be made to the low floor bus 10 described hereinabove and illustrated in the appended drawings. For example:

- while the bus 10 has been described as being rear driven, it can be modified so that the drive system is located in the front module 12 or partly in the front and rear modules 12 and 14;
- the present modular vehicle is not limited to having a single power source;
- illustrative embodiments of the present low front bus can be adapted so as to be autonomous;
- each of the front and rear modules 12 and 14 can be provided with a plurality of axles and/or each axle can be provided with more than two road wheels;
- the configuration of the above-described vehicle can be adapted to other types of vehicle than a one-level bus, such as a two-level bus, a school bus, an ambulance, a firetruck, a delivery vehicle, etc.
- the drive system, front and back load carrying axles and wheels may be substituted by motor wheels. Considering this, the expression front and back load-carrying axles should be construed in the claims as also including the combined axle portions of the front motor wheels, and combined axle portions of the back motor wheels respectively;
- while the present disclosure presented low floor buses being thirty and forty-feet long, the length of the central module 16 can be adapted to yield a low floor bus having another length;
- it is to be noted that the forms, number and positions of the mounting brackets may be different than illustrated;
- other attaching elements than brackets and fasteners can be used to interconnect the front and rear modules 12 and 14 with the central module 16, such as frame elements, snap-fitting, welding, or a combination thereof.

Although a low floor bus has been described hereinabove by way of illustrated embodiments thereof, it can be modified. It is therefore to be understood that numerous modifications may be made to the illustrative embodiments and that the scope of the claims should not be limited by the thereby but should be given the broadest interpretation consistent with the description as a whole.

What is claimed is:

1. A low floor road vehicle comprising:
    a front module having front and back sides and including a front load-carrying axle near the front side thereof, the front module including a driver's section configured to receive a driver's seat;
    a rear module having front and back sides and including a rear load-carrying axle; and
    a central module including i) a flat floor having a front, a back and two lateral sides, ii) first and second lateral walls, each one mounted to the flat floor so as to extend upwardly from a respective lateral side thereof, iii) a roof mounted onto the first and second lateral walls therebetween;
    the flat floor being attached at its front side to the front module at the back side thereof and at its back side to the rear module at the front thereof;
    the first and second lateral walls extending a) longitudinally beyond the front side of the flat floor so as to define a front module attaching portion that connects to the front module, and b) longitudinally beyond the back side of the flat floor so as to define a rear module attaching portion that receives the rear module therebetween.

2. The low floor road vehicle as recited in claim 1, wherein the front module has a nose section that includes the front load-carrying axle and the driver's section extending from the nose section to the back side of the front module.

3. The low floor road vehicle as recited in claim 2, wherein the driver's section includes an upper platform on a first lateral side thereof and a lower platform longitudinally adjacent the upper platform on a second lateral side thereof; the lower platform being levelled with the flat floor.

4. The low floor road vehicle as recited in claim 3, wherein the driver's section includes flail the driver's seat on the upper platform, adjacent to the first lateral wall and a door registered with the driver's seat adjacent to the second lateral wall.

5. The low floor road vehicle as recited in claim 1, wherein the rear module includes at least two lateral wheel arches;
    the rear module attaching portion includes a clearance on each of the first and second lateral walls that is registered with a respective one of the at least two lateral wheel arches.

6. The low floor road vehicle as recited in claim 1, wherein at least one of the front and rear modules includes a steering system coupled to a respective one of the front and rear load-carrying axles.

7. The low floor road vehicle as recited in claim 1, wherein the front and rear module each includes an independent steering system.

8. The low floor road vehicle as recited in claim 1, wherein the rear module includes a drive motor that is operatively coupled to the rear load-carrying axle.

9. The low floor road vehicle as recited in claim 1, wherein the flat floor has a multilayer structure including at least one of aluminum and foam therein.

10. The low floor road vehicle as recited in claim 9, wherein the multilayer structure includes both aluminum and foam therein.

11. The low floor road vehicle as recited in claim 1, wherein the roof has a multilayer structure including at least one of aluminum and foam therein.

12. The low floor road vehicle as recited in claim 11, wherein the multilayer structure includes both aluminum and foam therein.

13. The low floor road vehicle as recited in claim 1, wherein the roof extends along the full length of the first and second lateral walls, including above both the front and rear module attaching portions.

14. The low floor road vehicle as recited in claim 1, wherein at least one of the front module and rear modules includes a steel frame.

15. The low floor road vehicle as recited in claim 1, wherein the lateral walls of the central module each includes an aluminum frame.

16. The low floor road vehicle as recited in claim 1, which is electrically powered; the vehicle further comprising a battery module.

17. The low floor road vehicle as recited in claim 16, wherein the battery module is mounted onto the rear module.

18. The low floor road vehicle as recited in claim 17, wherein the battery module is removably mounted onto the rear module.

19. The low floor road vehicle as recited in claim 1 that is configured as a passenger bus.

20. A method of assembling a low-floor road vehicle comprising:
    providing a front module having front and back sides and including a first steel frame and a front load-carrying axle near the front side, the front module including a driver's section configured to receive a driver's seat;
    providing a rear module having front and back sides and including a second steel frame and rear load-carrying axle; providing a flat floor having front and back opposite sides and two opposite lateral sides;
    the flat floor being selected from a plurality of flat floors, each being defined by a length;
    mounting the front module to the front side of the flat floor and the rear module to the back side of the flat floor;
    providing two lateral walls;
    mounting each of the two lateral walls to the flat floor on a respective lateral side thereof so as to extend upwardly from the flat floor;
    the two lateral walls having respective lengths adapted to extend beyond the front and back sides of the flat floor so as to define respective front and rear module connecting portions;
    attaching the front and rear module connecting portions to the front and rear modules respectively providing a roof; and
    attaching the roof onto the two lateral walls therebetween.

21. The method of claim 20, wherein mounting the front module to the front side of the flat floor and the rear module to the back side of the flat floor includes further mounting at least one spacer between the flat floor and at least one of the front and rear modules.

22. A low floor bus comprising:
    a front module having front and back sides and including a nose section on the front side, a front load-carrying axle in the nose section, and a driver's section extending from the nose section to the back side of the front module;

the driver's section including an upper platform on a first lateral side thereof, a driver's seat on the upper platform, a lower platform longitudinally adjacent the upper platform on a second lateral side thereof;

a rear module having front and back sides and including a rear load-carrying axle; and a central module including i) a flat floor having a front, a back and two lateral sides and being levelled with the lower platform of the front module, ii) first and second lateral walls, each including an aluminum frame and being mounted to the flat floor so as to extend upwardly from a respective lateral side thereof, iii) a roof mounted onto the first and second lateral walls therebetween;

the flat floor being attached at its front side to the front module at the back side thereof and at its back side to the rear module at the front thereof;

the first and second lateral walls extending a) longitudinally beyond the front side of the flat floor so as to define a front module attaching portion that connects to the front module, and b) longitudinally beyond the back side of the flat floor so as to define a rear module attaching portion that receives the rear module therebetween;

the front module attaching portion of one of the first and second lateral walls including a door registered with the driver's seat.

\* \* \* \* \*